United States Patent [19]

Norsworthy

[11] Patent Number: 4,885,459
[45] Date of Patent: Dec. 5, 1989

[54] DEVICE AND SYSTEM FOR ENCODING A SUBSTRATE WITH AN INK

[76] Inventor: Jase O. Norsworthy, 2708 First Ave., North, Ste. 500, Billings, Mont. 59103

[21] Appl. No.: 102,517

[22] Filed: Sep. 29, 1987

[51] Int. Cl.⁴ .......................... G06K 1/12; G06K 19/06
[52] U.S. Cl. ...................................... 235/495; 235/491; 235/493; 235/494
[58] Field of Search ............... 235/495, 493, 419, 449, 235/375, 379, 432, 386, 487, 488, 489, 491, 494; 283/82, 83, 98–100, 107–109, 58; 282/3 A, 8 A, 8 C, 12 B, 14, 19 R, 19 A, 19 B, 23 R, 27 R, 28 R, 28 A, 29 B; 360/2

[56] References Cited

U.S. PATENT DOCUMENTS

| | | | |
|---|---|---|---|
| 1,747,788 | 2/1930 | Pauli | 283/58 |
| 2,704,634 | 3/1955 | Rauch | 235/487 |
| 2,779,540 | 1/1957 | Hoeppner | 235/493 |
| 3,113,516 | 12/1963 | Johnson | 235/487 |
| 3,125,748 | 3/1964 | MacRoberts et al. | 235/449 |
| 3,147,991 | 9/1964 | Heinz | 282/23 R |
| 3,258,857 | 7/1966 | Behn | 235/487 |
| 4,097,066 | 6/1978 | Davis | 282/29 B |
| 4,201,339 | 5/1980 | Gunn | 235/487 |
| 4,576,399 | 3/1986 | White | 282/8 A |

Primary Examiner—Alan Faber
Assistant Examiner—Robert A. Weinhardt
Attorney, Agent, or Firm—Sughrue, Mion, Zinn, Macpeak & Seas

[57] ABSTRACT

A simple and inexpensive device for magnetic ink encoding particularly suited for magnetically encoding either numerical or alphabetical characters onto negotiable instruments such as checks or mailing pieces such as envelopes. The device preferably comprises at least an upper and a lower ink impermeable element containing therebetween a carrier material permeated with one or more inks, one of which is preferably a magnetic ink, said upper element having pressure transmissive areas and markings identifying the perforations, said lower element having perforations corresponding to said upper element, such that encoding is made possible by selection of markings, applying pressure to the corresponding pressure transmissive area, thereby causing spatially oriented deposition of ink onto the substrate. The magnetic ink impressions can be automatically read by a magnetic reading device.

17 Claims, 5 Drawing Sheets

DEVICE AND SYSTEM FOR ENCODING A SUBSTRATE WITH AN INK

BACKGROUND OF THE INVENTION

This invention is concerned generally with the art of magnetic ink encoding, for example, magnetic encoding of the dollar or numerical amount for which an individual check or other instrument is written, or magnetic encoding of a zip code on a mail piece. More specifically, the check or other instrument or mail piece may be encoded at the time a person writes a check or instrument or prepares an item for mailing.

Every year billions and billions of checks are written. With rare exceptions when the payee bank "deposits" the check to the payee's account in the payee's bank, the depository bank must have an employee visually read the amount of the check and "key in" and cause to be printed on the lower right hand corner in magnetic ink, the amount of the check. Thus far this labor intensive, visual/manual process just described is the only way to magnetically encode a check entering the nationwide, Federal Reserve regulated, bank check clearinghouse system. This process of visual/manual encoding is repeated millions of times each day by hundreds of people seated for hours at a time in front of machines to cause magnetic ink encoding of individual checks.

Not only is this a time-consuming, expensive process, it adds to the delay in the check collection process resulting in increased "float" which is an enormous expense to the banking industry and consequently to the public it serves. "Float" costs hundreds of millions of dollars each year. In order to speed the check collection process, the Federal Reserve requires by regulation that every bank cause the encoding of every check initially deposited with it. As a result every bank regardless of size has at least one encoding machine which cost approximately $7,500. Larger banks can have twenty, fifty or one hundred such machines each requiring an operator. Any product which reduces the labor intensive check clearing process or speeds the collection process, thus reducing float, should be a welcome product, supported both by the Federal Reserve and the banking industry.

From the time the current system was adopted, the industry has looked for ways to reduce this expensive, labor intensive process. Many approaches have been attempted and discarded. Most all of those approaches have been mechanical. If something is mechanical it can break down and require replacement or repair. If the writer of the check is to "encode" the check at the time of writing the check, then the product or device must be with the writer at all times, preferably carried as part of a checkbook. Such a device must be able to withstand abuse; for example, people put checkbooks in their back pockets and then sit on them. The device should be unbreakable, and have no moving parts. Obviously, it must be small—almost unnoticeable—if it is sometime to be carried on the person. It must be simple and easy to use, and not be a time-consuming, difficult process, otherwise the check writer will refuse to, or will improperly, "encode" his check. The public writes a preponderance of personal checks and most of these are written from booklets of twenty-five checks carried on the person, in a purse, billfold or other carrying case. A device to encode such checks should be inexpensive and disposable with the booklet when the checks are all used, or transferable to a new booklet. If it is to be carried with such a small booklet of checks, it must, as noted, be very thin, almost unnoticeable, non-breakable, highly accurate, easy to use and understand and not time-consuming to use.

Likewise, many checks are written from large check books—the checks are bigger and they come in booklets with checks often being three to a page. Checks of this nature can be hand written or machine written. A product for encoding the check amount must be adaptable to checks of this nature. As a matter of fact, the product must be adaptable to all checks entering the national banking system else the likelihood of the encoding system being adopted by the banking industry and the Federal Reserve system is most unlikely.

Further, the encoding system must also be adaptable to the encoding of "deposit slips". For example, when a customer deposits one or more checks with his bank, the customer fills out a deposit slip on to which he enters all individual checks and also the total of all those checks. Currently, when a check is manually encoded, the encoding machine automatically totals all checks included in an individual deposit. The operator of the encoding machine then encodes the "total" of the deposit. When the deposit slip goes through the encoding machine's "proofing" step, it compares the total of all checks with the total of the deposit to be sure there are no addition or other errors. If the depositor could personally encode his deposit slips and all checks when written were personally encoded, then no labor would be required to encode either checks or deposit slips. The machine would automatically read the amount of the checks and deposit slip and compare the total for error without the manual/visual labor intensive process.

A method of encoding could also be adapted for encoding other items, for example, mail pieces. Methods and apparatus for magnetic encoding of mailing pieces are known as disclosed in U.S. Pat. No. 4,210,339. However, this known process requires prior preparation of the mailing piece, or the affixing of something (as by glue) to a mailing piece, so that the mailing piece has either pre-printed, or affixed to it, guide markers or grids with numerical values.

SUMMARY OF THE INVENTION

The primary object of the invention is to provide a simple, convenient, and inexpensive means for encoding a substrate. The device should simply and conveniently, by inexpensive means, permit, for example, the writer of a check, or a deposit slip, or a cash item or other instrument of debit or credit entering the bank collection process of the national and state banking systems, to "encode" such instrument in such a way that a machine can "read" the encoding done by the writer of the instrument and then impress at the appropriate location on such instrument in magnetic, or other electro-responsive, machine readable ink, the dollar amount of the instrument. The same basic encoding process, either of numerical, alphabetical or dollar amounts, should be applicable with equal or better results to other industries, such as postal zip codes, sales, inventory and accounting, to name a few.

The previously described problems in this art are solved by a simple and inexpensive device for magnetic ink encoding particularly suited, for example, for magnetically encoding amounts onto negotiable instruments such as checks. As a first embodiment of the invention, the device preferably comprises a plastic shell structure having at least an upper and a lower element and containing therebetween an ink permeated carrier designed and constructed in such a way that application of pressure in designated pressure transmissive areas on the upper element causes extrudation of magnetic ink through perforations in the lower element corresponding to the upper element pressure transmissive areas. The pressure transmissive areas are arranged in rows and columns corresponding to dollar and cent values. The element permits deposition of spatially oriented magnetic ink marks onto a substrate by placing the device over a substrate, selecting a pressure transmissive area on the upper element corresponding to a desired value, applying pressure through the upper element pressure transmissive area, thereby causing pressure to the carrier and deposition of magnetic ink through the lower element perforation onto the substrate in a position corresponding to the value or unit desired to be encoded. Magnetic and non-magnetic ink impressions can be automatically read by an electro-responsive reading device.

As a second embodiment of the invention, there is a device adapted for magnetically encoding zip codes on the address side of a mailing piece. The device is constructed according to the above principle, but has a grid system adapted for selection of numerals for encoding a zip code. The envelope is encoded at the time it is addressed by the party addressing the envelope, and in its most normal use the same writing instrument (i.e., pen or pencil) used to address the envelope may be used to encode the zip code using the encoder. The present invention overcomes the problems of prior art mail encoding systems and provides a device and method which permits encoding of any substrate, including a conventional mail piece which is not pre-printed, and without the requirement of adhering additional papers to the mail piece.

The uniqueness of the present invention is (1) its portability, (2) its smallness, (3) indestructibility, (4) inexpensiveness, (5) the "carrier" (of more than one electro-responsive ink), (6) the ability of a user to encode a check or a zip code with an ordinary pen, and (7) the elimination of the necessity for a check or mailing piece, or an article affixed to a mailing piece, to have pre-printed either electro-responsive markers and/or a grid with assigned numerical values.

BRIEF DESCRIPTION OF THE FIGURES

FIGS. 6 and 7 describe a second application of the same invention.

DETAILED DESCRIPTION OF THE INVENTION

The invention consists of several specially sized perforated sheets of plastic designed to overlay any commercial check or other credit instrument, regardless of the size or shape. For illustrative purposes a check will be encoded to describe the invention although the invention will be equally applicable to other credit instruments in general use in the banking industry, as well as to instruments used in other industries, such as postal zip codes, sales, inventory and accounting.

The top piece of plastic (FIG. 1) will generally be of a thickness of approximately 1/128 of an inch. It will preferredly have on one of its sides a "code" system (1) so that the writer of the check can indicate that he, and he alone, wrote the check and encoded the same. This code system will also provide a means by which a person other than the check writer can indicate that he (not the check writer) encoded the check. Three precisely located holes (2), (3) and (4), will be drilled in the top plastic sheet and other sheets as noted hereafter. The purpose of these holes will be to serve as guide markers which will line up with three guide markers (28), (29) and (30), (FIG. 5), printed on the check or other credit instrument. Further the top plastic sheet will preferredly have ninety rectangles (5) marked thereon, each approximately 5/32 of an inch high and ⅜ of an inch long. There are ten rectangles in each vertical column (6) and nine in each horizontal row (7). The top horizontal row containing nine rectangles (8) will have the numeral "one" (9) marked in the right side of each rectangle and a hole (10) punched through the plastic—approximately 3/32 of an inch in diameter—on the left side of each rectangle. The second row will contain the numeral "two" (11) in the position corresponding to, and immediately under the numeral "one" (9) in the first row (8) and holes as described in the first row. The procedure so repeated from 1 through 9 and the zeros.

Figure 1:
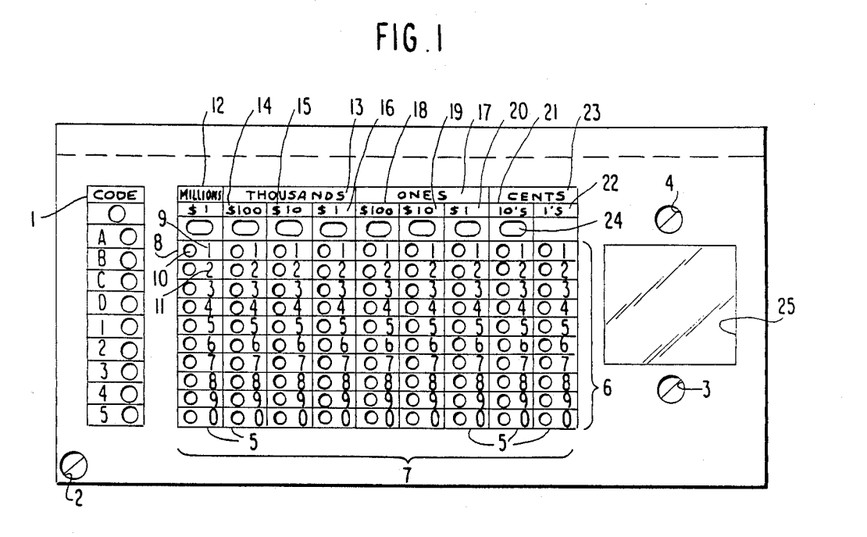
FIG. 1 is a plan view of the top sheet of the device found to be particularly useful for purposes of this invention showing a first embodiment of the invention wherein the ovals as well as the large and small circles adjacent the numbers, including the three circles circumscribing a diagonal line, represent holes.

The nine vertical columns will then have a heading reading from left to right that designates the first row as a "millions" (12) column, the second, third and fourth columns as "thousands" (13) with designations under that of 100's, (14) 10's and (15) 1's (16), the fifth, sixth and seventh rows will be designated as "ones" (17) with 100's (18), 10's (19) and 1's (20) respectively and finally the eighth (21) and ninth rows (22) will be designated as "cents" (23). Each designated column will have a hole immediately under the respective column (24). The purpose of the holes will be explained later. Appropriate "printing" and "coloring" may appear on the top sheet of plastic, to make the grid easy to understand, i.e. the "cents" columns, the "ones" columns, and so forth might be different colors.

A square (25) may be cut out on the right side so that the writer may at all times see the actual amount for which he wrote the check. Alternatively, this square may not be cut out, but simply clear enough (25) that he writer can see the amount of the check. Finally, there will be three specially drilled holes, (2), (3) and (4) two on the right side of the plastic sheet and one on the left. These will be located so as to inform the writer of the check that he has properly placed the encoder over the face of the check. The check will have printed on its face a cross-mark or other symbol (2), (3) and (4) which when visible through the three openings just described will indicate that the encoder is properly positioned over the underlying check. As will be noted later, when the encoder is made a part of a printed check or deposit book, it will automatically be properly positioned over the underlying check.

Immediately under the top sheet of plastic is a second sheet of plastic (sheet 7, FIG. 4) that is very thin but fairly strong—such as the plastic sheeting for a sandwich bag. this sheet is the same size as the top sheet and affixed to the top sheet by heat or glue or chemical means. The purpose of this sheet is to keep an instrument, such as a pen used by the writer of the check, from going through to make contact with the next layer below the ink carrier. Also it serves to keep chemicals, lodged in the fabric or other material making up the underlying layer, from evaporting. This sheet will have no holes in it except possibly the window to see the amount of the check and/or the check positioning marks. Alternatively, this sheet could be a part of the intermediate third layer described immediately hereinafter by becoming the top sheet of the intermediate layer.

Figure 3:
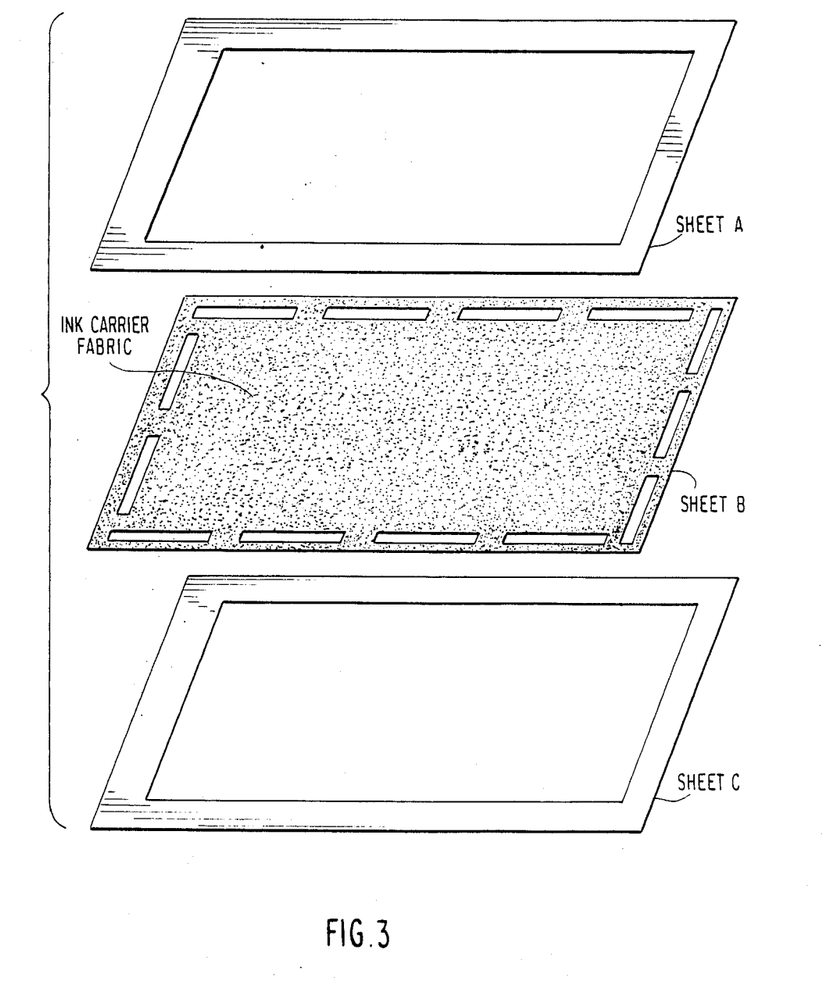
FIG. 3 shows in perspective and in greater detail an ink "carrier" comprising plastic frames "A" and "C" and ink impregnated fabric "B" unassembled, which when assembled makes up the ink "carrier", which may carry magnetic ink and/or other electro-responsive, machine readable ink, such as a fluorescent ink.

The intermediate layer (FIG. 3) will be sized so that it underlies all of the "code", "numerical grid" and "dollar designation" areas, but not the positioning mark holes or the dollar amount viewing opening. The intermediate layer serves as a carrier for the magnetic ink material (sheet B, FIG. 3) and may take anyone of several forms and be of different materials such as sponge, felt-like material, and so forth. As described here, it is cotton fabric similar to the old typewriter ribbon. It will be encased in a stiffened plastic rectangle frame (sheets A and C, FIG. 3) designed in such a way that when turned over no spot on the fabric will be opposite a hole in the top plastic before it was reversed. In other words, it will be shifted about 3/16 of an inch up and down, right or left or both (see note FIG. 3). The fabric or other material will be presoaked with magnetic ink (sheet B, FIG. 3) which may or may not be colored and may or may not contain a chemical which will react to another chemical deposited on the commercial checks being encoded.

Figure 4:
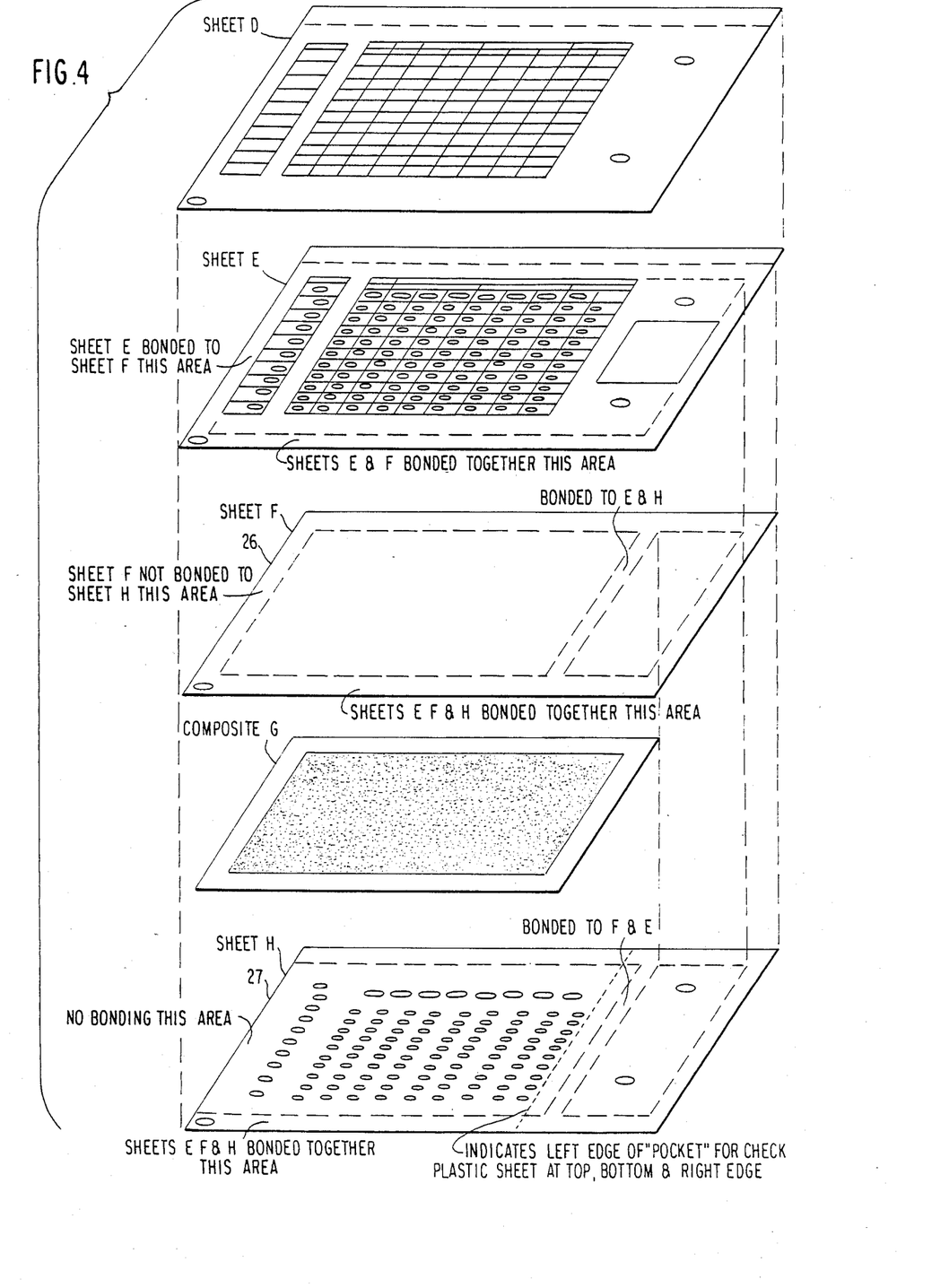
FIG. 4 is a perspective view of all the parts of the encoding device, including an assembled "carrier" as shown in FIG. 3 and a "pocket" to securely hold a check while it is being encoded by the encoding or writing instrument. The carrier is removable, replaceable and reversible. A pocket is formed with an opening at the left edge between sheets "H" on the bottom and sheets "E" and "F" on top.

Underlying the intermediate layer (the inked layer) is a fourth layer of plastic sheeting (sheet C, FIG. 4), the exact size of the top plastic sheet, with holes and openings of the same diameter, size and location as the holes and openings of the top sheet of plastic. This layer, in its most general form, will be secured to the 2nd and first layers (Sheets E and F, FIG. 4) by heat, glue or chemical means (sheet C, FIG. 4), around the edges and the edges and the square opening, where the writer views the amount of the check, but not along the left side edge of the several layers (26) and (27). The left edge will be open so that the third layer (sheet B, FIG. 4)—the ink soaked layer—may be inserted and/or removed, turned over and re-inserted or replaced entirely. One of the features by removing, turning over and reinserting is to place opposite each and every hole of the top and bottom layer inked fabric that has not previously been opposite any other hole. There will be no printing on the fourth layer (FIG. 4).

Once the specially designed grid, plastic sheet and magnetically inked fabric have been formed into one unit (FIG. 4) that is flexible, non=mechanical, durable and at lest as damage proof as the check it is to encode, it is ready to encode a check.

The check is a companion to the encoder for it must have all the qualities of currently used checks. plus it should have markers affixed to its face (28), (29) and (30) (the location of which will vary with different sized checks) which not only indicate to the check writer the proper placement of the encoder over the check, but also later indicate to the mechanical reader of the dollar amount encoded by the writer of the check, the actual location of the grid on each different sized check. As conceptualized here the grid will always be the same size (thus all mechanical readers can be standardized) regardless of the size or shape of the check. The markers on the check will disclose to the mechanical reader the location of the grid. This will be explained in more detail later.

As an alternative to the pre-printed marker as described in the paragraph immediately above, and as will be described under an alternative application of this invention hereafter, the carrier may be constructed in such a way that the ink underlying the marker holes is of an electro-responsive non-magnetic material such as fluorescent ink. If such a carrier were used on a check, the check writer would simply impress with his writing instrument the marker holes thereby depositing on the face of the check fluorescent ink that can later be machine read the same as the pre-printed fluorescent marker would have been read. For the purposes of this description, however, it is assumed that he markers are pre-printed—not impressed on the check by the check writer.

This invention is inexpensive enough the manufacture in volume that in all likelihood when a booklet of twenty-five checks plus deposit slips is printed and bound together, one of these encoders will likewise be bound on top of the checks and hinged in such a way that the encoder may be lifted out of the way like a bookcover, the check written and then the cover folded back over the check and the writer will then encode the check he has just written. He will encode in the following manner after lining the encoder up properly over the check (using the encoder and check markers):

First, he should take his pen and place the point of the pen in the appropriately designed holes (1) (FIG. 1) (probably two) assigned to him by his bank (the purpose of this will be explained later) and make a firm circular motion. This will cause magnetically soaked ink carrier to be impressed on the face of the underlying check.

Next the writer should continue with his pen and impress the appropriate holes for the exact dollar amount of his check.

Figure 5:
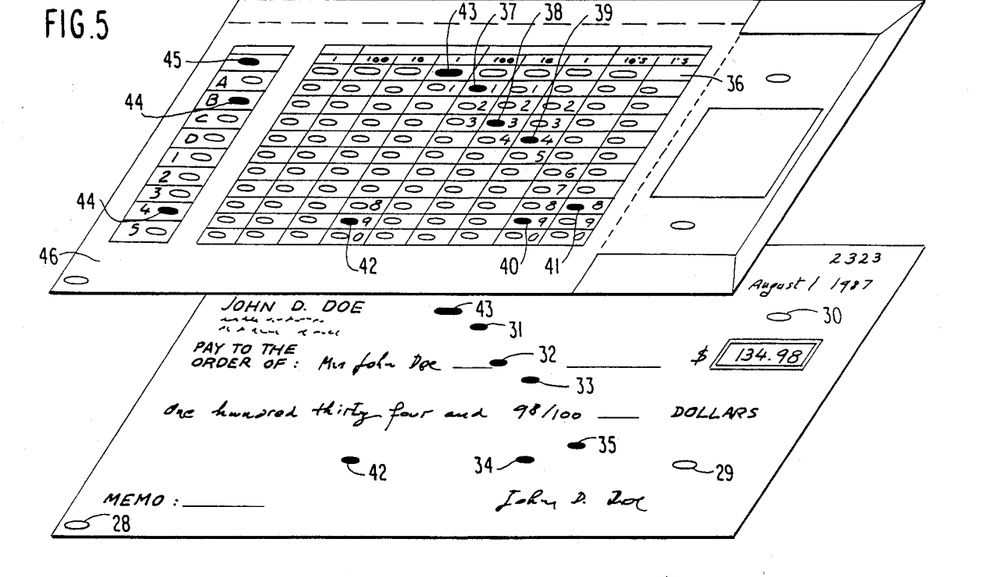
FIG. 5 is a perspective view of an encoded check and the encoder depicting an example of the holes which might be impressed and the ink deposited thereby to encode the underlying check.

Last, across the top of the ninety square grid is the row (36) (FIG. 9) with holes opposite the designations for millions, thousands, ones and cents. He must impress the appropriate hole to indicate that no numbers in the columns he impresses nor any number to the left thereof are usable. This will preclude someone impressing a number to the left of the last number impressed by the writer and thus causing the machine to read the check for an unappropriate amount. For example, FIG. 5 is an illustration of holes to be impressed on the encoder, if a check is for $134.98. The writer would impress the 1 in the fifth column from the right (37)—designated $100 under the "ones" row and then moving to the right impress, as is appropriate, a 3 (38), a 4 (39), a 9 (40) and an 8 (41). If he does nothing else someone later could impress a mark opposite nine in the $1 row of the "thousands" rows (42) and a machine would read the check as $9,134.98. If the writer impresses the hole opposite the $1 in the "thousands" rows (43), this would tell the machine to disregard any marks overtly or inadvertently made in that row or any of the rows to the left of that row. The check shown in perspective in FIG. 5 is an illustration of the magnetic ink deposited on the face of the check for the amount of $134.98, (31), (32), (33), (34) and (35). Additionally, there is shown on the check the mark (43) that instructs the machine reading the check to disregard any marks in the $1 row of the "thousands" rows or any rows to the left thereof.

Once the check has been delivered to the payee by the writer of the check, all parties will respond to the check according to the amount appearing in the face of the check the same as would happen today. However, when the check arrives at the "proofing" station of the bank to which it is first deposited, it will be fed into a machine which will "read" the magnetic ink impressed on its face by the writer of the check. In order to do this, the marks (2), (3) and (4) on the check made by the manufacturer will indicate to the machine the location of the "grid" and exactly where each "hole" on the grid is located on the check. Each "hole" has a designated number value in the machine's memory so that when it "reads" a certain location it knows that the location is, for example, the one under the $100 row of the "hundreds" row, and so on. Once this "reading" has taken place and all numbers to the left have been ignored—or none appear—the machine is ready to "order" the actual printing in the place designated by the banking industry for that dollar amount. In this case since it is a check, the amount would be printed in the bottom right hand corner—the same place it is now visually/manually encoded. The check is now ready to make its way through the national banking industry check clearing process.

An additional feature of the invention, as discussed above, is the ability of the writer to code the check with a special code. The check writer has already been assigned by his bank a unique number identifying his account. If the bank assigns him an additional one or two letter code that is not preprinted on his check, but retailed in the check writer's memory, then if at the time the check is written the writer encodes on the check his special one or two letter code, the writer has done something that only he can correctly do. For example, assume that a bank has assigned a check writer a special code that is "B-4" (44). The machine would read that code in the same manner that it read the dollar amount and impress immediately following the check writer's pre-printed account number the code letter or letters. If the banking industry or the Federal Reserve adopted a reward and/or penalty system, similar to over-draft and cash credits for encoding done by a depositor (this is actually being done now), then when the bank charges the check to its customer's account (the check writer) it could give him a credit for encoding the check—or charge his account if he did not. In order to encourage almost everyone to encode his check ultimately some kink of reward and punishment system will probably be adopted. This code system anticipates that day and the appropriate response to it.

As noted earlier this "code system" also provides a means by which a person other than the check writer can indicate that he (not the check writer) encoded the check. If it is assumed that in order to keep his account from being charged for not encoding a check, that a potential check writer pre-impressed his special code on all his checks, but later did not actually encode each check's amount, then, if in order to start the check through the national check clearing process, someone else—a bank teller or someone in the proofing room—encoded the check, then the check writer would get credit for encoding a check he did not actually encode. In order to negate this activity on the part of a check writer, a special perforation appears immediately above the special code area (45). If a party other than the check writer actually becomes the person to encode the check, he will be asked to mark this special perforation. If this location is marked, the machine reading the encoded check will "override" the check writer's special code and not give him credit for encoding the check.

Figure 2:
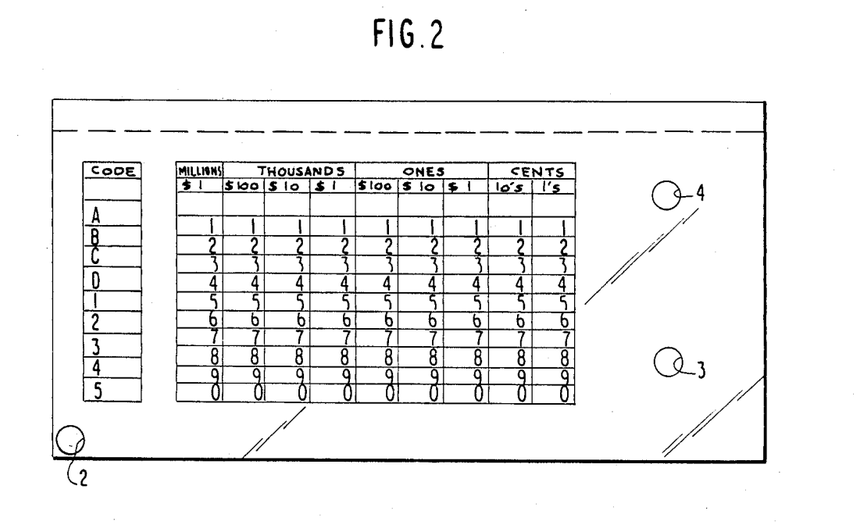
FIG. 2 is a plan view of the "proofing" sheet which is a clear plastic sheet printed as shown and which contains no holes.

A variation of this invention is a clear plastic sheet (sheet D, FIG. 4 and FIG. 2) of identical size to the encoder, with no holes, but with printing identical to the printing appearing on the earlier described "top sheet" of the encoder (FIG. 1), which clear plastic sheet is affixed to the top of the "top sheet", so that it may be folded back (like a book cover) along a scored line (sheet D, FIG. 4 and FIG. 2) when the check writer is encoding his check. After encoding his check the writer may tear the check out of the check book, place it on top of what was the originally described "top sheet" (sheet E, FIG. 4), fold the "new" top sheet (sheet D, FIG. 4 and FIG. 2) down on top of the check, and viewing the amount for which he has written the check on the right side, verify the appropriate numerical values to see that magnetic ink has been appropriately deposited on the face of the check.

As an alternative embodiment of the invention, there is an application generally concerned with magnetically encoding the zip codes on the address side of a mailing piece. For brevity, an embodiment specifically tailored for application to an envelope containing a letter will be described in detail, but it will be readily apparent that the invention can be adapted for use with any type mailing piece by simple modification. Although the zip code encoder described herein is for a five number zip code, the encoder can just as easily be designed as a nine number encoder. The envelope is encoded at the time it is addressed by the party addressing the envelope, and in its most normal use the same writing instrument (i.e., pen or pencil) used to address the envelope may be used to encode the zip code using the encoder.

The present invention overcomes the problems of prior art mail encoding systems and provides a device and method which permits encoding of any substrate, including a conventional mail piece which is not pre-printed, and without the requirement of adhering additional papers to the mail piece.

The uniqueness of the present invention is (1) its portability, (2) its smallness, (3) indestructibility, (4) inexpensiveness, (5) the "carrier" (of more than one electro-responsive ink), (6) the ability of a user to encode the zip code with an ordinary pen, and (7) the elimination of the necessity for the mailing piece, or an article affixed to the mailing piece, to have pre-printed either electro-responsive markers and/or a grid with assigned numerical values.

One of the reasons for this description of an entirely different use of this invention is to emphasize that when the grid is changed (for example, to a zip code configuration) and/or the ink carrier is changed (for example, by introducing two inks—one non-magnetic and one magnetic, but both being electro-responsive) the function and purpose can likewise be changed. The primary reason for its adaptability and change of function is that the grid is easy to change and the ink carrier can be modified to carry more than one electro-responsive inked material, chemical or color of ink.

The ink, chemical and/or color characteristics can be introduced to different perforations, openings or areas of the carrier and the grid. For example, encoding the zip code on an envelope is an entirely different application of this invention. In this application, a grid and perforations, as described later, are on an assembled encoder of the same approximate size and with the same components as the encoder described in FIGS. 1 and 4; that is, all the layers would be the same and would be assembled as shown in FIG. 4. However, in this instance, one-half inch in from the left edge of the encoder will be two markers holes arranged one over the other and approximately two inches apart. This process will be repeated on the right edge of the encoder, only the marker holes will be approximately ⅜ of an inch closer to each other.

Figure 6:
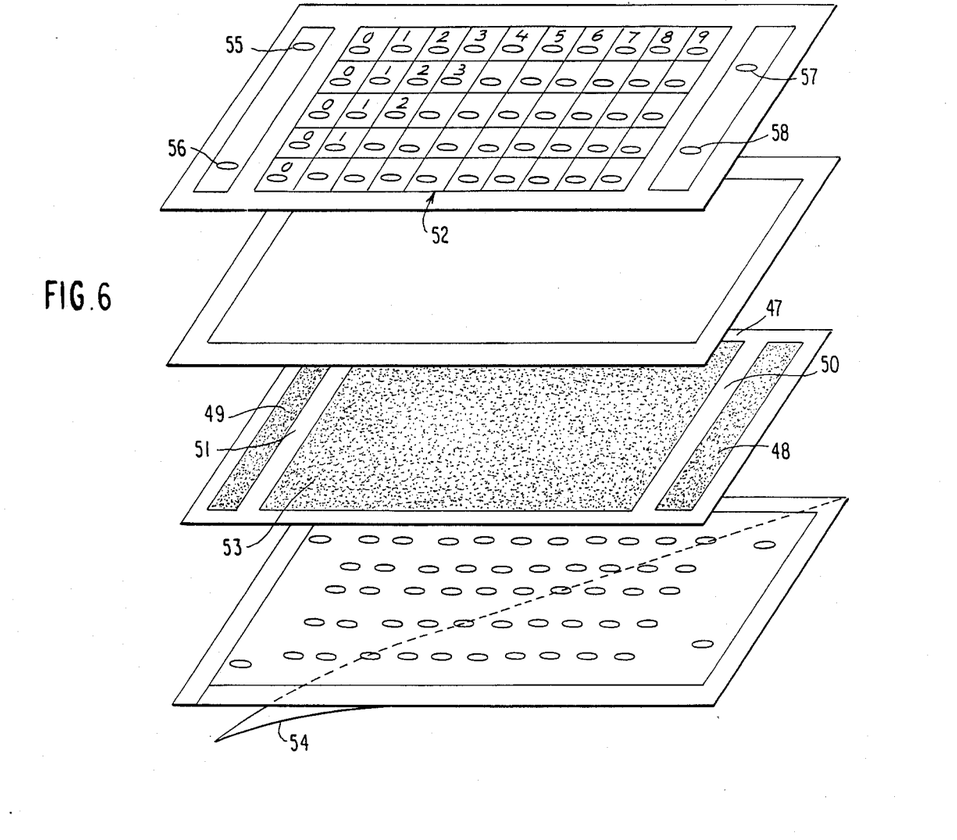
FIG. 6 is an exploded plan view showing the sheets comprising an encoder with an ink "carrier" that has non-magnetic, electro-responsive ink, such as fluorescent ink, underlying the areas on the extreme left and right edges of the encoder where are located the four "markers. A magnetic, electro-responsive ink underlies the enumerated zip code grid of the encoder.

The inked carrier will be constructed with a frame that is one-fourth inch wide. A strip of fabric containing non-magnetic, electro-responsive ink will be laminated in a one-half inch strip running from the top to the bottom of the carrier on both the left (48) and right (49) sides of the carrier and held in place by a one-quarter inch laminated plastic strip one inch in from the respective sides (50) (51) of the encoder and the one-quarter inch frame.

In the space between the areas containing the two non-magnetic inked strips will be a grid on the top sheet (52) containing five (5) horizontal rows and ten (10) vertical rows with the numerical values designated from left to right and with holes just below each assigned numerical value from zero (0) through nine (9) on the ten horizontal rows. Underlying this portion of the grid, and laminated into place by the one-quarter inch plastic strips (50) (51) (holding the inside edges of non-magnetic inked fabrics in place) and by the carrier frame at the top and bottom, will be a fabric (53) impregnated with magnetic, electro-responsive ink.

On the back side of the encoder can be a triangular piece of plastic which is bonded to the encoder on the right edge and the bottom to form a "pocket" (54) into which an envelope may be firmly secured while being encoded.

Figure 7:
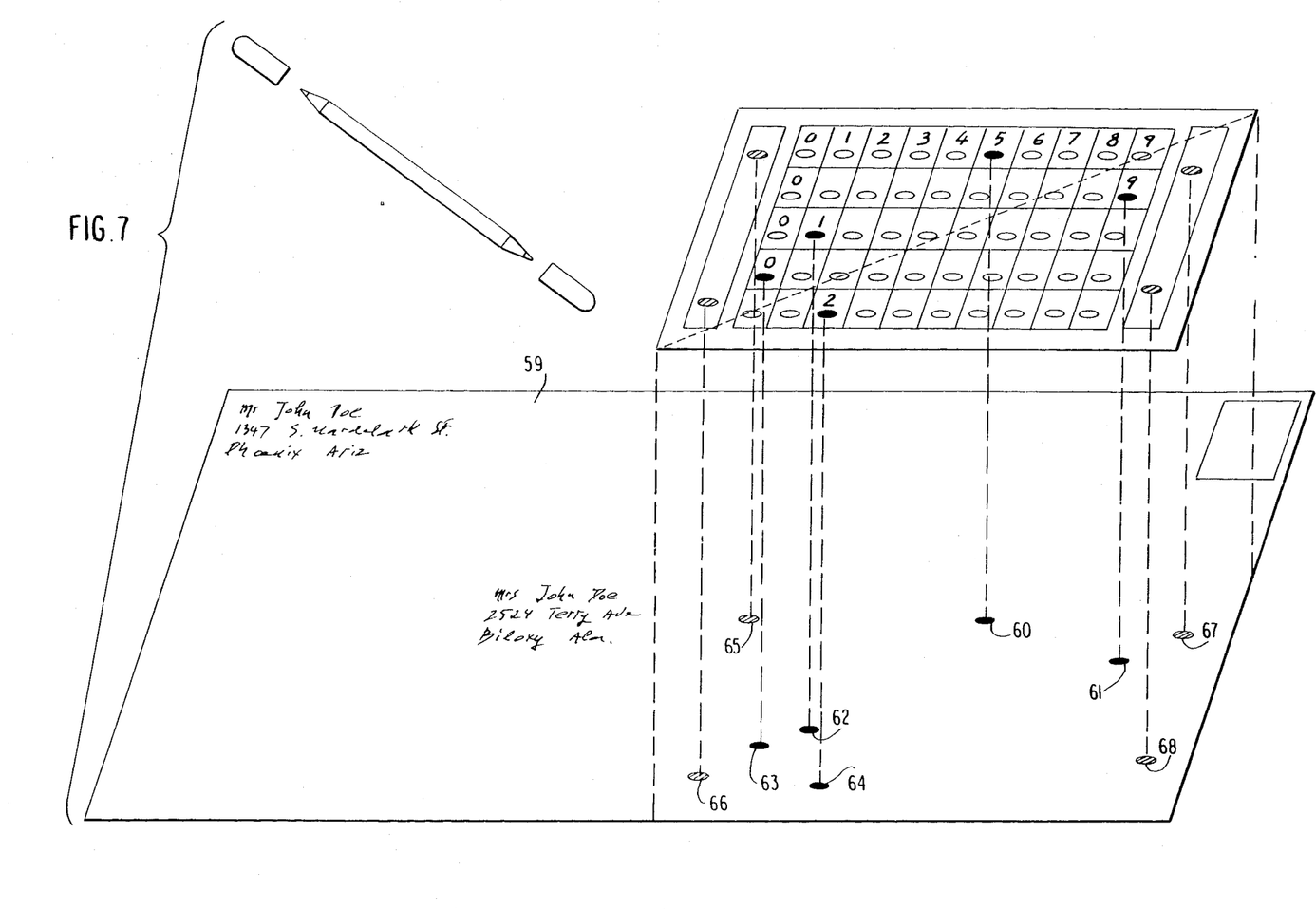
FIG. 7 is a perspective view of the encoder with a projection of an envelope. The encoder shows the perforations which have been marked to impress non-magnetic, electro-responsive ink, such as a fluorescent ink onto the envelope in the marker positions and deposits of magnetic ink on the envelope for the zip code impressions.

The user of the device in this configuration (with appropriate pocket device) would place the envelope in the pocket so that the bottom right hand corner of the envelope to be sent through the U.S. mails is in the pocket. Using the same pen he addressed the envelope with or any other pen or pointed instrument, the user would then mark the four marker holes, two on the left (55), (56) side and the two on the right side (57), (58) of the encoder, thereby depositing on the face of the envelope the electro-responsive fluorescent ink. He would then move to the grid and mark the appropriate holes on the grid for the zip code, thereby depositing on the face of the envelope the electro-responsive magnetic ink.

As to the mailing piece subsequently goes through a machine that "reads" (is responsive to) fluorescent and magnetic inks, the machine will respond to the four markers (fluorescent material) to establish the location of the zip code grid. Once the machine knows the location of the zip code grid, it will then "read" (respond to) the magnetic ink deposited in loci that have specific numerical values. FIG. 7 shows an envelope encoded by means of such a grid and marker system and reflects a zip code, 5 (60), 9 (61), 1 (62), 0 (63), 2 (64), marked between the four markers (65), (66), (67), (68)—the zipo code in this instance being in magnetic ink and the markers being in fluorescent ink.

Changes in either the grid configuration, positioning of electro-responsive inks of different materials (such as magnetic and fluorescent inks) or different color inks at various combinations of locations in the carrier make the potential uses of this invention significantly greater than described herein.

What I claim is:

1. A device for encoding a check or other debit or credit instrument, comprising an upper element comprised of a material essentially impermeable to ink materials and having marked thereon a grid comprising rows and columns of identifying marks beside each of which are situated corresponding pressure transmissive areas, an intermediate element of carrier material permeated with at least one ink material, and a lower element comprised of a material impermeable to inks the same size as the upper element and having perforations corresponding to the pressure transmissive areas of the upper element, said upper and lower elements being attached, and said intermediate element being situated between said upper and lower element 2. A device for encoding, comprising an upper element comprised of a material essentially impermeable to ink materials and having marked thereon a grid comprising rows and columns of identifying marks beside each of which are situated corresponding pressure transmissive areas, an intermediate element of carrier material permeated with at least one ink material, and a lower element comprised of a material impermeable to inks the same size as the upper element and having perforations corresponding to the pressure transmissive areas of the upper element, said upper and lower elements being attached, and said intermediate element being situated between said upper and lower element, wherein the upper element is comprised of a first sheet and a second sheet laminated together, said first sheet comprised of a strong, thin and flexible material essentially impermeable to ink materials with the first sheet having marked thereon a grid comprising rows and columns of identifying marks, and having perforations corresponding to and situated immediately adjacent to the identifying marks, wherein said second sheet of the upper element is comprised of thin, flexible membrane-like material essentially impermeable to ink materials and situated immediately below said first sheet and laminated thereto, and wherein pressure applied to the second sheet of the upper element through the perforation in the first sheet is transmitted through the perforation of the first sheet and the membrane-like thin material of the second sheet to the intermediate sheet of carrier material.

3. A device for encoding, comprising an upper element comprised of a material essentially impermeable to ink materials and having marked thereon a grid comprising rows and columns of identifying marks beside each of which are situated corresponding pressure transmissive areas, an intermediate element of carrier material permeated with at least one ink material, and a lower element comprised of a material impermeable to inks the same size as the upper element and having perforations corresponding to the pressure transmissive areas of the upper element, said upper and lower elements being attached, and said intermediate element being situated between said upper and lower element, and wherein at least one of the ink materials permeating the intermediate elements is selected from the group consisting of a magnetic ink material and electro-responsive, machine readable ink material.

4. A device for encoding a substrate, comprising an upper element comprised of a material essentially impermeable to ink materials and having marked thereon a grid comprising rows and columns of identifying marks beside each of which are situated corresponding pressure transmissive areas, an intermediate element of carrier material permeated with at least one ink material, and a lower element comprised of a material impermeable to inks the same size as the upper element and having perforations corresponding to the pressure transmissive areas of the upper element, said upper and lower elements being attached, and said intermediate element being situated between said upper and lower element, said device further having at least three light transmissive areas extending entirely through the device sufficient to permit viewing of alignment guide markers printed on the substrate.

5. A device as in claim 1 adapted for use with a check as a substrate, said check having a writing area, wherein the device further has a viewing portion adjacent said grid and extending through all elements of the device to permit seeing through all elements to said writing area.

6. A device for encoding, comprising an upper element comprised of a material essentially impermeable to ink materials and having marked thereon a grid comprising rows and columns of identifying marks beside each of which are situated corresponding pressure transmissive areas, an intermediate element of carrier material permeated with at least one ink material, and a lower element comprised of a material impermeable to inks the same size as the upper element and having perforations corresponding to the pressure transmissive areas of the upper element, said upper and lower elements being attached, and said intermediate element being situated between said upper and lower element, wherein said upper and lower element are joined in a manner forming a pocket capable of removably receiving said intermediate element, such that upon removing, reorienting and reinserting said intermediate element, fresh portions of the intermediate element will be exposed through the perforations in the lower element.

7. A device for encoding, comprising an upper element comprised of a material essentially impermeable to ink materials and having marked thereon a grid comprising rows and columns of identifying marks beside each of which are situated corresponding pressure transmissive areas, an intermediate element of carrier material permeated with at least one ink material, and a lower element comprised of a material impermeable to inks the same size as the upper element and having perforations corresponding to the pressure transmissive areas of the upper element, said upper and lower elements being attached, and said intermediate element being situated between said upper and lower element, wherein the grid marked on the upper element is an encoding grid comprising numerals arranged in ten rows and nine columns, each row having the same numeral, each column having numerals in ascending or descending value, and each numeral having a pressure transmissive area adjacent thereto.

8. A method for encoding a dollar value on a substrate using a device adapted for placing oriented magnetic or other electro-responsive, machine readable marks on said substrate, and said substrate adapted to receiving said magnetic or other electro-responsive, machine readable marks, wherein the device is comprised of:

an upper element comprised of a material impermeable to ink materials and having an encoding grid comprising numerals arranged in ten rows and nine columns, each row having the same numeral, each column having numerals in ascending or descending value, and each numeral having a pressure transmissive area adjacent thereto, an intermediate element of carrier material permeated with at least one ink material, and a lower element comprised of a material impenetrable to inks the same size as the upper element and having perforations corresponding to said upper element pressure transmissive areas, said three elements being held together as a device, said device further having at least three light transmissive areas extending completely through the device and situated outside the grid area so the substrate may be viewed therethrough, and wherein said substrate adapted to receiving said magnetic or other electro-responsive, machine readable ink marks has three non-magnetic electro-responsive, machine readable marks pre-printed on said substrate, said three marks corresponding to three light transmissive areas in the device so that when the device is placed over the surface of the substrate to be encoded, the three marks can be viewed through the light transmissive areas, wherein the method comprises placing the device over the substrate with alignment of the three light transmissive areas with the three preprinted markers on the substrate, selecting from the appropriate column and row a dollar value to be encoded, applying pressure through the pressure transmissive areas corresponding to the value selected to be encoded thereby causing deposition of magnetic or other electro-responsive, machine readable ink on the substrate in a precise spatial position corresponding to the value selected.

9. A method as in claim 8, wherein the upper element further has headings above the columns identifying one "millions", three "thousands", three "ones" and two "cents" columns, and having an additional row of pressure transmissive areas above the columns, and wherein causing ink to be deposited on the substrate in the position corresponding to this additional row of pressure transmissive areas designates that no numbers in that column nor any number to the left thereof are usable to represent dollar or cent values.

10. A method as in claim 8, wherein the upper element further has at least one additional column comprised of numerals or letters and adjacent pressure transmissive areas, whereby ink may be caused to be deposited in the area under this column in a pattern.

11. A device for magnetic encoding of a substrate,
said device consisting of four layers of a magnetic ink impermeable plastic material and having a viewing port to permit viewing a portion of a substrate,
said device comprised of a first layer having at least three light transmissive areas extending entirely through the device to permit viewing of alignment guide markers printed on a substrate to be marked,
said first layer having an encoding grid comprising numerals arranged in ten rows and nine columns, each row having the same numeral, each column having numerals in ascending or descending value, and each numeral having a pressure transmissive area adjacent thereto,
said first layer further having headings marked above the grid designating from left to right the first column as a "millions" column, the second, third and fourth columns as the "thousands" columns, the fifth, sixth and seventh columns as the "ones" column, and the eight and ninth columns as the "cents" columns,
said first layer having an additional pressure transmissive area immediately adjacent each respective column defined above,
said device further comprised of a second plastic layer located under the first layer and being the same size as the first layer and affixed to the first layer, said second layer having no perforations,
said device further comprised of a third layer of plastic sized so that it underlies all of the "encoding" pressure transmissive areas, but not the viewing ports, said third layer comprised of a plastic holder and a carrier impregnated with a magnetic ink material encased in a stiffened frame, and
a fourth layer of plastic, the same size as the first layer, with perforations corresponding to the pressure transmissive areas of the first layer, and light transmissive areas of the same shape, size and location as those of the upper element of plastic, said fourth layer secured to the first and second layers.

12. A device for magnetic encoding of a substrate, comprised of an upper element of plastic having a thickness of approximately 1/128 of an inch,
said upper element having ninety rectangles marked thereon arranged in a grid of rows and columns, each rectangle approximately 3/32 of an inch high and 3/16 of an inch long, comprising ten rectangles in each vertical column and nine rectangles in each horizontal row, the top horizontal row having the numeral "one" marked inside of and to the right side of each rectangle and an approximately 3/32 inch diameter perforation through the plastic on the left side of each rectangle, and each successive row of rectangles having marked a successively higher digit in each rectangle than the row of rectangles marked on said upper element immediately above it and further having a perforation in the rectangle which perforation is on the plane of the upper element and immediately below the perforation in the row immediately above it,
said upper element further having two rows of headings marked above the columns designating from left to right in the first row the first column as a "millions" column with the further designation under that in the second row of "1", designating in the first row of the second, third and fourth columns as "thousands" with further designations under that in the second row of 100's, 10's and 1's, designating in the first row of the fifth, sixth and seventh rows as "ones" with further designation underneath in the second row as 100's, 10's and 1's columns respectively and the first row of the eight and ninth columns being designated as "cents" with the further designation under that and in the second row of 10's and 1's,
said upper element having a perforation immediately above or below each column,
said upper element further having printing or coloring to facilitate optical recognition of sections by a user,
said upper element having a transparent viewing area cut out or made transparent on the right side to permit seeing writing on the substrate,
said device further having three specially located viewing ports, two on one side of the plastic element and one on the other side, located so as to permit optical alignment of the device with the substrate by aligning these perforations with corresponding marks printed on the substrate,
said device having immediately under the upper element of plastic a second element of plastic the same size as the upper element and affixed to the upper element by heat or glue or chemical means having no perforations or having only a transparent viewing area to see the numerical values on the writing area of the substrate and/or the substrate positioning marks,
said device having a third layer sized so that it underlies all of the perforations designated for marking, but not the viewing ports or the transparent viewing area, said third layer comprised of a plastic holder and a carrier impregnated with a magnetic or other electro-responsive, machine readable ink material, said carrier being selected from the group consisting of sponge, felt-like material, and cotton fabric, said plastic holder encasing the periphery of the carrier in a stiffened plastic rectangle frame sized in such a way that when turned over no loci on the carrier previously exposed through a perforation will again be exposed through a perforations, and
said device having a fourth layer of plastic the same size of the upper element of plastic, with perforations and open or transparent areas of the same shape, size and location as those of the upper element of plastic, and said fourth layer secured to the first and second layers by heat, glue or chemical means around the edges and the transparent viewing area where the user views the writing on the substrate, and along from one to three edges of the device.

13. A method for encoding a substrate, involving an element adapted for orienting magnetic or other electro-responsive, machine readable ink marks on a substrate, a substrate adapted to receiving said magnetic or other electro-responsive, machine readable ink marks, and a pen containing a magnetic or other electro-responsive, machine readable ink, wherein said element is comprised of a material impermeable to ink materials and having a grid of numerals arranged thereon arranged in ten rows and nine columns, each row having the same numeral, each column having numerals in ascending or descending value, and each numeral having a perforation adjacent thereto, said element further has at least three additional perforations extending completely through the device and situated outside the grid area so the substrate may be viewed therethrough, said substrate adapted to receiving said ink marks has three non-magnetic or other electro-responsive, machine readable ink marks pre-printed on the substrate, said three marks corresponding to three perforations in the element so that when the element is placed face up on the face of the to be encoded, the three marks can be seen through the perforations, and a pen containing an electro-responsive, machine readable ink differing in kind from said three non-magnetic electro-responsive, machine readable ink marks, said pen adapted to deposit said ink through said perforations, wherein the method comprises placing the device over the substrate and aligning the three perforations situated outside the grid area with the three pre-printed marks on the substrate, selecting from the appropriate column and row perforations the perforation to which pressure is to be applied, inserting the pen through the appropriate perforation thereby causing deposition of magnetic ink on the substrate in a precise spatial position corresponding to the information to be encoded.

14. A method for encoding a substrate as in claim 13, wherein said element adapted for orienting magnetic marks further comprising an additional perforation adjacent the grid area, and said system further permits marking through this perforation and recognizes such marking as overriding other previously indicated information.

15. A device for ink encoding, comprised of a single element of durable plastic, said plastic element having three guide markers corresponding to three guide markers printed on a substrate, said element further having ninety rectangles marked thereon arranged in a grid of rows and columns, each approximately 3/32 of an inch high and 3/16 of an inch long, comprising ten rectangles in each vertical column and nine rectangles in each horizontal row, the top horizontal row having the numeral "one" marked in the right side of each rectangle and a 3/32 inch diameter perforation through the plastic on the left side of each rectangle, and each successive row of rectangles having marked a higher digit in each rectangle than the immediately above row of rectangles and further having an adjacent perforation, the nine vertical columns have a heading marked above them reading from left to right that designates the first row as a "millions" column with the further designation under that of "1", designating the second, third and fourth columns as "thousands" with further designations under that of 100's, 10's and 1's, designating the fifth, sixth and seventh rows as "ones" with further designation underneath of 100's, 10's and 1's respectively and the eight and ninth designated as "cents", each designated column having a hole immediately above the respective column, said element further having optical recognition means for easy recognition of sections by a user, said device having an area on one side thereof where the plastic is transparent, thereby permitting a user to see the substrate underlying that portion of the device, said device further having three specially located viewing ports, two on one side of the plastic element and one on the other, located so as to permit optical alignment with corresponding marks printed on the substrate, and said viewing ports being sufficiently large to permit making contact with the substrate through the viewing ports with a pen containing a magnetic or other machine readable ink.

16. A device for encoding a mailing piece, comprising:

an upper element comprised of a material impermeable to ink materials having an encoding grid comprised of five rows and ten columns of numerals, each numeral having an adjacent perforation, each column having the same numeral marked beside a perforation, each row having numerals in ascending or descending value marked beside each perforations, and said upper element further having at least two perforations outside the grid area, an intermediate element of a carrier material permeated with a magnetic ink in the area exposed through the grid, and a non-magnetic, electro-responsive, machine readable ink in the area outside the grid, and a lower element comprised of a material impermeable to inks the same size as the upper element and having perforations corresponding to the upper element perforations, said upper and lower elements being attached, and said intermediate element being inserted between said upper and lower element.

17. A device for encoding a mailing piece as in claim 16, wherein said lower element is comprised of two sheets joined at two sides to define a pocket suitable for receiving a corner of an envelope.

* * * * *

UNITED STATES PATENT AND TRADEMARK OFFICE
CERTIFICATE OF CORRECTION

PATENT NO. : 4,885,459

DATED : December 5, 1989

INVENTOR(S) : Jase O. Norsworthy

It is certified that error appears in the above-identified patent and that said Letters Patent is hereby corrected as shown below:

Column 6, line 18, delete "lest" and insert --least--;

Column 6, line 48, delete "he" and insert --the--;

Column 8, line 12, delete "kink" and insert --kind--; and

Column 10, line 23, delete "zipo" and insert --zip--.

Signed and Sealed this

Fifteenth Day of January, 1991

Attest:

HARRY F. MANBECK, JR.

*Attesting Officer*  *Commissioner of Patents and Trademarks*